(12) United States Patent
Getz

(10) Patent No.: US 8,609,201 B2
(45) Date of Patent: Dec. 17, 2013

(54) INFRARED CURING PROCESS FOR TOUCH PANEL MANUFACTURING

(75) Inventor: Catherine A. Getz, Holland, MI (US)

(73) Assignee: TPK Touch Solutions Inc., Taipei (TW)

( * ) Notice: Subject to any disclaimer, the term of this patent is extended or adjusted under 35 U.S.C. 154(b) by 441 days.

(21) Appl. No.: 12/663,384

(22) PCT Filed: Jul. 2, 2008

(86) PCT No.: PCT/US2008/068987
§ 371 (c)(1),
(2), (4) Date: Dec. 7, 2009

(87) PCT Pub. No.: WO2009/006512
PCT Pub. Date: Jan. 8, 2009

(65) Prior Publication Data
US 2010/0183823 A1    Jul. 22, 2010

Related U.S. Application Data

(60) Provisional application No. 60/947,819, filed on Jul. 3, 2007.

(51) Int. Cl.
*B05D 3/06*    (2006.01)

(52) U.S. Cl.
USPC ........ 427/557; 427/96.1; 427/97.3; 427/97.4; 427/97.6; 427/108; 427/126.1; 427/126.2; 427/165; 427/376.6; 427/383.3; 427/404; 427/419.1; 438/100; 257/59; 257/72; 345/173

(58) Field of Classification Search
None
See application file for complete search history.

(56) References Cited

U.S. PATENT DOCUMENTS

| | | | |
|---|---|---|---|
| 6,327,069 B1 * | 12/2001 | Allemand et al. | 359/265 |
| 6,440,491 B1 * | 8/2002 | Varaprasad et al. | 427/168 |
| 6,488,981 B1 * | 12/2002 | Richter et al. | 427/58 |
| 6,620,454 B2 * | 9/2003 | Varaprasad et al. | 427/164 |
| 6,627,918 B2 * | 9/2003 | Getz et al. | 257/59 |
| 7,217,344 B2 * | 5/2007 | Sasaki et al. | 204/192.26 |
| 2002/0034836 A1 * | 3/2002 | Kiyota et al. | 438/48 |
| 2004/0086717 A1 * | 5/2004 | Sasaki et al. | 428/411.1 |
| 2005/0037184 A1 * | 2/2005 | Halsey et al. | 428/210 |
| 2007/0062919 A1 * | 3/2007 | Hamada et al. | 219/121.71 |
| 2007/0074316 A1 * | 3/2007 | Alden et al. | 977/762 |
| 2010/0230643 A1 * | 9/2010 | Nakajima et al. | 252/512 |

* cited by examiner

*Primary Examiner* — Timothy Meeks
*Assistant Examiner* — Michael P Rodriguez
(74) *Attorney, Agent, or Firm* — Gokalp Bayramoglu; Anna Tsang

(57) ABSTRACT

An infrared energy oxidizing and/or curing process includes an infrared oxidation zone having an infrared energy source operable to emit infrared energy that oxidizes a conductive thin film deposited or established on a glass substrate to establish a light transmissive or transparent conductive thin film for manufacturing of a touch panel. Optionally, the infrared energy curing process provides an in-line infrared energy curing process that oxidizes the conductive thin film on the glass substrate as the glass substrate is moved past the infrared energy source. Optionally, the infrared energy curing process bonds a thick film silver frit electrode pattern to the conductively coated glass substrate. Optionally, the infrared energy curing process reduces the transparent conductive thin film.

10 Claims, 2 Drawing Sheets

Process Flow

INFRARED CURING PROCESS FOR TOUCH PANEL MANUFACTURING

CROSS REFERENCE TO RELATED APPLICATION

The present application is a 371 national phase filing of PCT Application No. PCT/US08/068,987, filed Jul. 2, 2008, which claims benefit of U.S. provisional application Ser. No. 60/947,819, filed Jul. 3, 2007, which are hereby incorporated herein by reference in their entireties.

FIELD OF THE INVENTION

The present invention relates to curing processes for computer touch panel manufacturing.

BACKGROUND OF THE INVENTION

It is known that in interactive information devices such as touch panels and pen-input devices, there is usually at least one rigid glass substrate coated with a transparent conductive coating such as indium tin oxide (ITO) or doped tin oxide. Depending on the coating deposition process, the transparent conductive coating may need to be further oxidized to achieve optimum transparency and further reduced to achieve optimum electrical conductivity. This curing process requires elevated temperature in a forced dry air environment followed by the introduction of an inert atmosphere forming gas. It is also known that in interactive information devices such as touch panels and pen-input devices, there are usually thick film electrode patterns deposited on the conductive films. These thick film electrode patterns, typically silver fit compounds, also need to be thermally bonded to the conductive thin film and the glass substrate under the conductive thin film. This process, known as fit firing, also requires elevated temperatures. Prior practice for performing the required oxidation, reduction, and electrode bonding processes included processing in convection heat transfer batch style ovens. While batch oven processes are able to perform oxidation, reduction, and electrode firing within a single cycle, the cycle time required is excessive due to the inefficiency of convective heat transfer and the large thermal mass of the material batch. Temperature non-uniformity, as well as atmosphere distribution of the batch process can also cause variation in product performance. Continuous product flow ovens performing oxidation only and continuous product flow ovens performing reduction only are also common process options. These continuous flow ovens, also known as "lehrs", can utilize both convective and infra-red heat transfer mechanisms. This process option is also inefficient from a product through put perspective in that the product needs to be processed through two separate machines, requiring the heat up and cool down segments of the process to occur twice.

SUMMARY OF THE INVENTION

The present invention combines thin film oxidation, electrode pattern bonding, and thin film reduction utilizing an infrared energy source for oxidizing the thin film, bonding the electrode pattern and reducing the thin film, such as in a continuous flow fashion utilizing one machine.

The present invention provides an improved process using infrared energy curing for computer touch panel manufacturing, such as in an in-line curing process. The present invention relates to using an infrared energy in-line curing process to oxidize and subsequently reduce the transparent conductive thin film such as indium tin oxide (ITO) commonly used in computer touch panel manufacturing. The present invention relates to using an infrared energy in-line curing process to oxidize and subsequently reduce the transparent conductive thin film such as indium tin oxide (ITO) commonly used in computer touch panel manufacturing and thermally bond the conductive thick film electrode patterns commonly used in computer touch panel manufacturing.

The present invention provides an improved process using an infrared energy in-line curing lehr for computer touch panel manufacturing. The infrared in-line curing lehr performs the oxidation curing process for the conductive thin film such as indium tin oxide on glass substrates used in touch panel manufacturing. The infrared in-line curing lehr concurrently performs the bonding process of the thick film pattern such as silver fit on conductive thin films and glass substrates used in touch panel manufacturing. The infrared in-line curing lehr subsequently performs the inert atmosphere reduction curing process for the conductive thin film such as indium tin oxide on glass.

These and other objects, advantages, purposes and features will become apparent upon review of the following specification in conjunction with the drawings.

DESCRIPTION OF THE PREFERRED EMBODIMENTS

Figure 1:
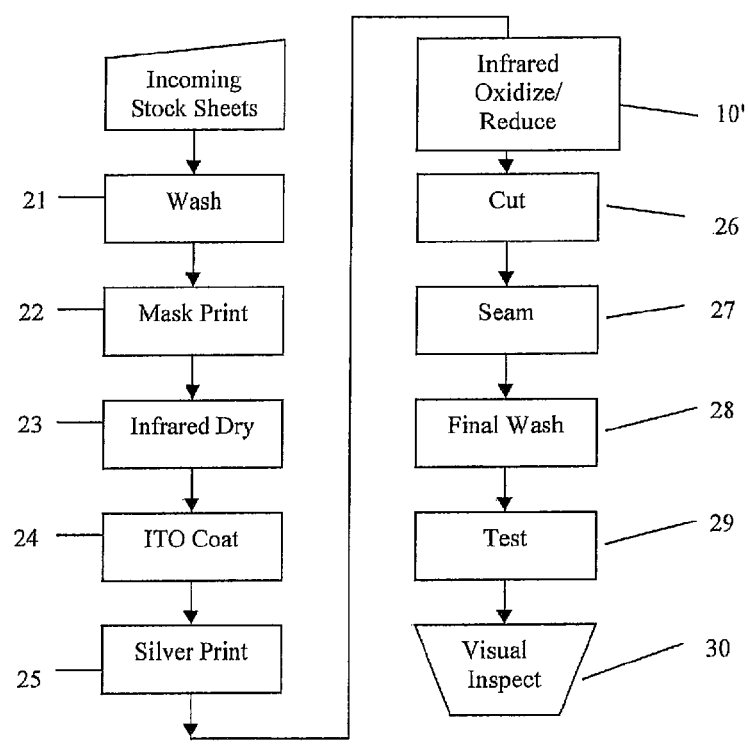
FIG. 1 is a process flow diagram for computer touch panel manufacturing in accordance with the present invention.
Figure 2:
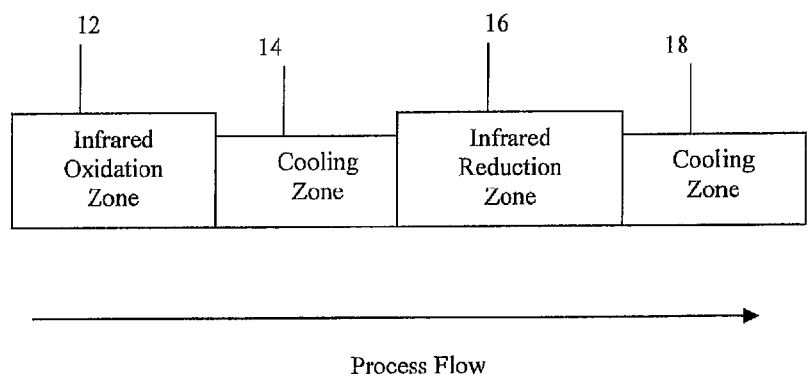
FIG. 2 is a diagram of the process stages within the infrared oxidation/reduction lehr in accordance with the present invention.

Referring now to the drawings and the illustrative embodiments depicted therein, FIG. 1 depicts the general process sequencing 20 for the manufacturing of conductively coated, electrode patterned glass substrates for computer touch panel in accordance with the present invention. As shown in FIG. 2, the process of oxidizing and/or reducing the thin conductive film may be accomplished in an in-line infrared energy curing lehr 10, which includes an infrared oxidation zone 12, a cooling zone 14, a reduction zone 16 and a final cooling zone 18. The infrared energy lehr 10 utilizes infrared energy or heat to oxidize the thin film conductive layer (which may initially comprise an opaque layer or film) to establish the desired transparency thereof or transmission of light therethrough, as discussed below.

As shown in FIG. 1, incoming raw glass substrates begin processing with a wash step at 21, followed with a mask patterning step at 22. The washed glass substrates with mask patterns then proceed to an infrared drying step to prepare the mask pattern for thin film deposition at 23. The thin conductive film (such as indium tin oxide or ITO or the like) is deposited or coated on the substrate at 24. When initially deposited or coated on the substrate, the thin conductive film may comprise an opaque film. After the thin conductive film is established on the glass substrate, a thick film silver fit electrode pattern or patterns is then screen printed at 25 on the conductively coated glass mask patterned substrate.

The conductively coated mask and silver fit electrode patterned glass substrate is then ready for oxidation of the thin film (to establish the desired transmissivity and conductivity properties), bonding of the silver frit to the conductor film and glass substrate, and subsequent reduction of the conductive thin film. These processes may be accomplished at or via an infrared oxidization and/or curing and/or reducing process or device at 10'. For example, and with reference to FIG. 2, these processes may be performed or accomplished via an in-line infrared energy oxidation/reduction/curing lehr 10. The infrared energy oxidation and/or reduction and/or curing lehr comprises an infrared energy source, such as an infrared heating bulb or element or the like, that is operable to emit infrared energy (such as at a preselected or desired or appropriate wavelength) at the substrate to oxidize the thin conductor film to establish the desired or appropriate transparent or light transmissivity characteristics of the film and the desired or appropriate conductivity characteristics of the film, and to bond the silver fit to the conductor film and to the glass substrate, and to reduce the conductive thin film, as desired for the particular application of the substrate and touch panel.

Optionally, and desirably, the infrared energy oxidation/reduction curing lehr comprises an in-line lehr that is operable to oxidize, bond and reduce, as described above, while the substrate is continuously or substantially continuously moving through the lehr and past the infrared energy source, such as via a conveyor or transfer device or any other suitable conveying means or mechanism that transports the substrates past or beneath the infrared energy source at a rate that allows for the desired degree of oxidation and bonding and curing and the like. The infrared energy source may heat the coatings or films or frit without heating or substantially heating the glass substrate. As shown in FIG. 2, the infrared energy source, or a first infrared energy source, and optionally in conjunction with air, such as dry air, or other suitable gas, may oxidize the thin conductor film at the infrared oxidation zone 12, and the coated substrate may then be cooled at a first cooling zone 14. The infrared energy source, or a second infrared energy source, and optionally in conjunction with a suitable forming gas or the like, may then be operable to reduce the thin conductor film at the infrared reduction zone 16, and the coated substrate may then be cooled at a second cooling zone 18, all while the substrate or substrates are continuously or substantially continuously moving along and/or through the lehr 10 (such as from left to right in FIG. 2).

Optionally, the in-line oxidation/reduction/curing lehr may also or otherwise use other heating means, such as infrared or near-infrared heating means or microwave heating means and/or the like. Optionally, the coatings on the substrate may be heated by the heating means with the heating means disposed above the substrates or below the substrates or otherwise at or near the substrates as the substrates are conveyed through the in-line lehr. Optionally, the heating means may heat and oxidize/reduce/cure the coatings through the substrates, depending on the particular application and arrangement of the heating means and conveying means at or in the in-line lehr.

After exiting the oxidation/reduction/curing lehr (or in a subsequent process within the lehr), the cured conductively coated electrode patterned glass substrates are cut to the desired or appropriate or selected size (which varies depending on the particular application of the touch panel) at 26 and fabricated with a smoothed edge with the edge grinding process known as seaming at 27. The final sized and seamed conductively coated electrode patterned glass substrate is then washed at 28 (such as via any suitable washing process). The finished product may then be electronically tested at 29 and visually inspected at 30.

When the manufacturing process 20 is completed, the glass substrate has a transparent conductor film (with the desired or selected degree of transmissivity of light therethrough and the desired or selected degree of conductivity at the glass substrate surface) with the silver frit pattern established on the glass substrate and the now transparent conductor film, and is ready for use in or assembly of the touch panel. The manufacturing and/or assembly process and/or the finished product may utilize aspects of the processes and/or products described in U.S. Pat. Nos. 5,725,957; 6,001,486; 6,087,012; 6,440,491; 6,620,454; 6,627,918; 6,706,552; 6,787,240; and/or 7,165,323; and/or U.S. patent application Ser. No. 09/946,228, filed Sep. 5, 2001 by Ippel et al. for PLASTIC SUBSTRATE FOR INFORMATION DEVICE AND METHOD FOR MAKING SAME; Ser. No. 09/974,209, filed Oct. 10, 2001; Ser. No. 10/744,522, filed Dec. 23, 2003 by Halsey et al. for METHOD FOR MAKING AN INTERACTIVE INFORMATION DEVICE; Ser. No. 10/798,171, filed Mar. 11, 2004 by Getz for LASER DELETION FOR TOUCH SCREEN; Ser. No. 11/218,374, filed Sep. 2, 2005, now U.S. Pat. No. 7,507,438; and/or Ser. No. 11/440,855, filed May 25, 2006, which are all hereby incorporated herein by reference in their entireties.

Therefore, the present invention uses infrared energy for processing (such as oxidizing, curing and/or reducing) the transparent conductors or films and/or the silver frit, instead of using known convective or conductive heat transfer to cure the film and frit. The infrared energy source may function to heat the thin conductor film in a manner that oxidizes the film to establish the desired or appropriate transmissivity qualities or properties or characteristics and/or to establish the desired or appropriate conductivity qualities or properties or characteristics. The infrared energy source may also function to heat the silver frit pattern to cure the fit on the glass substrate and thin conductor film. Optionally, the substrate or substrates (with the thin film conductor coating and fit pattern established thereon) may move (such as in a continuously moving manner or substantially continuously moving manner) past the infrared energy source as part of an in-line curing process to provide enhanced manufacturing processes for the coated and fitted glass substrates.

Changes and modifications to the specifically described embodiments may be carried out without departing from the principles of the present invention, which is intended to be limited only by the scope of the appended claims as interpreted according to the principles of patent law.

The invention claimed is:

1. A method of processing a substrate for a touch panel utilizing infrared energy, said method comprising:
   providing an infrared energy source operable to emit infrared energy;
   providing a glass substrate with a conductive thin film disposed on a surface of said glass substrate;
   oxidizing said conductive thin film via operation of said infrared energy source to establish a transmissivity property of said conductive thin film for manufacturing of a touch panel;
   bonding a thick film silver frit electrode pattern to said conductive thin film on said glass substrate via operation of said infrared energy source at the same time as oxidizing said conductive thin film is carried out; and
   reducing said conductive thin film via operation of said infrared energy source.

2. The method of claim 1, wherein said infrared energy source is incorporated in an in-line infrared energy curing process that oxidizes said conductive thin film on said glass substrate as said glass substrate is moved past said infrared energy source.

3. The method of claim 1, wherein oxidizing said conductive thin film comprises oxidizing said conductive thin film to establish a transparent property of said conductive thin film.

4. The method of claim 1, wherein oxidizing said conductive thin film comprises oxidizing said conductive thin film to establish a selected conductivity property of said conductive thin film.

5. The method of claim 1, wherein said conductive thin film comprises indium tin oxide.

6. The method of claim 1, wherein said infrared energy source is operable to emit infrared energy at a preselected wavelength in bonding a thick film silver frit electrode pattern to said conductive thin film coated glass substrate.

7. The method of claim 6, wherein said infrared energy source is operable to emit infrared energy at a preselected wavelength in reducing said transparent conductive thin film.

8. The method of claim 1, wherein said infrared energy is operable to emit infrared energy at a preselected wavelength in reducing said transparent conductive thin film.

9. A method of processing a substrate for a touch panel utilizing infrared energy, said method comprising:

providing an infrared energy source operable to emit infrared energy;

providing a glass substrate coated with a conductive thin film on a surface of said glass substrate; and wherein said infrared energy source is in a continuous flow of first (a) oxidizing said conductive thin film as said glass substrate is moved past said infrared energy source to establish a transparent conductive thin film for manufacturing of a touch panel and bonding a thick film silver frit electrode pattern to said conductively coated glass substrate as said glass substrate is moved past said infrared energy source; and second (b) reducing said transparent conductive thin film as said glass substrate is moved past said infrared energy source.

10. The method of claim 9, wherein said conductive thin film comprises indium tin oxide.

\* \* \* \* \*